(12) United States Patent
Ikeno et al.

(10) Patent No.: US 7,659,004 B2
(45) Date of Patent: Feb. 9, 2010

(54) LIQUID SILICONE RUBBER COATING COMPOSITION, CURTAIN AIR BAG, AND METHOD OF PRODUCING SAME

(75) Inventors: Masayuki Ikeno, Maebashi (JP); Tsutomu Nakamura, Annaka (JP); Hidenori Mizushima, Annaka (JP); Shigeru Ubukata, Takasaki (JP); Daichi Todoroki, Annaka (JP); Takashi Tanaka, Sakai (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/044,446

(22) Filed: Mar. 7, 2008

(65) Prior Publication Data

US 2008/0220675 A1 Sep. 11, 2008

(30) Foreign Application Priority Data

Mar. 9, 2007 (JP) .............................. 2007-059985

(51) Int. Cl.
*B32B 9/04* (2006.01)

(52) U.S. Cl. .................... 428/447; 280/728.1; 524/588; 524/493

(58) Field of Classification Search ................. 428/447; 280/728.1; 442/164, 168; 524/32, 493, 588
See application file for complete search history.

(56) References Cited

U.S. PATENT DOCUMENTS

| | | | |
|---|---|---|---|
| 4,742,103 A | 5/1988 | Morita et al. | |
| 5,595,826 A | 1/1997 | Gray et al. | |
| 5,625,022 A | 4/1997 | Onishi | |
| 5,877,256 A | 3/1999 | Nakamura et al. | |
| 6,387,520 B1 | 5/2002 | Fujiki et al. | |
| 6,780,919 B2 | 8/2004 | Ikeno et al. | |
| 2005/0043454 A1 | 2/2005 | Ushida et al. | |
| 2006/0159935 A1 | 7/2006 | Mizushima et al. | |
| 2006/0177673 A1 | 8/2006 | Ikeno et al. | |
| 2007/0281097 A1 | 12/2007 | Ikeno et al. | |
| 2007/0281564 A1 | 12/2007 | Mizushima et al. | |

FOREIGN PATENT DOCUMENTS

| | | |
|---|---|---|
| EP | 0 439 791 | 7/1992 |
| EP | 0 497 349 A2 | 8/1992 |
| EP | 0 681 014 | 11/1995 |
| EP | 0 735 100 | 10/1996 |
| EP | 1 688 463 | 8/2006 |
| EP | 1 808 467 | 7/2007 |
| EP | 1 865 039 | 12/2007 |
| EP | 2 053 161 | 4/2009 |
| JP | 4-178461 | 6/1992 |
| JP | 2001-287610 | 10/2001 |
| JP | 2002-138249 | 5/2002 |
| WO | WO 2008/020635 | 2/2008 |

OTHER PUBLICATIONS

U.S. Appl. No. 12/181,682, filed Jul. 29, 2008, Ikeno, et al.
Gmelin, Zirkonium, 1958, p. 373.

*Primary Examiner*—Arti Singh-Pandey
(74) *Attorney, Agent, or Firm*—Oblon, Spivak, McClelland, Maier & Neustadt, L.L.P.

(57) ABSTRACT

Provided is a liquid silicone rubber coating composition, including predetermined quantities of (A) an organopolysiloxane containing 2 or more Si atom-bonded alkenyl groups, (B) an organohydrogenpolysiloxane containing 2 or more SiH groups, (C) an addition reaction catalyst, (D) a finely powdered silica with a specific surface area of at least 50 $m^2/g$, (E) an organosilicon compound containing an epoxy group and a Si atom-bonded alkoxy group, and (F) an oxyzirconium compound. The composition is useful for producing a silicone rubber coating layer on the substrate surface of a curtain air bag. The air bag suppresses leakage of the inflator gas, thus enabling the inflation time to be sustained for a satisfactory period.

19 Claims, No Drawings

LIQUID SILICONE RUBBER COATING COMPOSITION, CURTAIN AIR BAG, AND METHOD OF PRODUCING SAME

CROSS REFERENCE TO RELATED APPLICATION

This application claims priority to Japanese Patent Application No. 2007-059985, filed on Mar. 9, 2007.

BACKGROUND OF THE INVENTION

1. Field of the Invention

The present invention relates to a liquid silicone rubber coating composition that is ideal for producing air bags for vehicles and the like, wherein a film of a silicone rubber coating is formed on a fibrous fabric such as 6,6-nylon, 6-nylon or polyester, and is particularly suited to the production of curtain air bags, which unlike the air bags installed for the driver's seat and passenger seat, are housed along the edge of the roof from the front pillar, and must be capable of maintaining an inflated state for a certain period of time in order to protect the region around the head and prevent people being flung from the vehicle during a collision or rollover of the vehicle, and also relates to a curtain air bag having a silicone rubber coating layer comprising a cured product of such a composition, and a method of producing such an air bag.

2. Description of the Prior Art

Conventional air bag silicone rubber compositions used for forming a rubber coating on a fibrous fabric, include the compositions described below. For example, patent reference 1 discloses a liquid silicone rubber coating composition for an air bag that exhibits excellent adhesion to base fabrics, prepared by adding an inorganic filler, an organopolysiloxane resin, and an epoxy group-containing organosilicon compound to an addition curable composition. Patent reference 2 discloses a liquid silicone rubber coating composition for an air bag that develops excellent adhesion to base fabrics upon heat curing for a short period, prepared by adding an inorganic filler, an organopolysiloxane resin, an organotitanium compound, and an alkyl silicate or alkyl polysilicate to an addition curable composition. Patent reference 3 discloses a silicone rubber coating composition for an air bag with excellent thin-film coating properties, in which the viscosity of a vinyl group-containing organopolysiloxane is restricted to not more than 8,000 centipoise. Patent reference 4 discloses a liquid silicone rubber composition for coating that is used in the production of a silicone rubber-coated base fabric with reduced tackiness, and is prepared by adding a wet silica with an average BET specific surface area within a range from 150 to 250 $m^2/g$ and an average particle size of not more than 20 µm to a rubber coating composition.

However, when these compositions are used in curtain air bag applications, because all of the compositions suffer from inferior adhesion to the air bag base fabric, none of the compositions is able to satisfactorily suppress leakage of the inflator gas to enable the inflation time to be sustained for a satisfactory period.

Addition-curable compositions containing a zirconium compound which is related to the present invention are disclosed in Patent References 5 to 8. However, the zirconium compounds described as examples in these references are four-coordinate compounds, but oxyzirconium compounds used in the present invention are not disclosed therein.

[Patent Reference 1] U.S. Pat. No. 5,877,256
[Patent Reference 2] JP 2002-138249 A
[Patent Reference 3] JP 2001-287610 A
[Patent Reference 4] U.S. Pat. No. 6,387,520
[Patent Reference 5] U.S. Pat. No. 4,742,103
[Patent Reference 6] JP 4-178461 A
[Patent Reference 7] EP 0497349 A2
[Patent Reference 8] U.S. Pat. No. 5,625,022

SUMMARY OF THE INVENTION

The present invention takes the above circumstances into consideration, with an object of providing a liquid silicone rubber coating composition that is able to suppress leakage of the inflator gas in inflation of an air bag, and therefore is excellent in sustaining the inflation time, and also providing a curtain air bag comprising a cured product of such a composition, and a method of producing such a curtain air bag.

As a result of intensive investigation aimed at achieving the above object, the inventors of the present invention discovered that when a liquid silicone rubber coating composition, comprising: (A) an organopolysiloxane containing at least 2 alkenyl groups bonded to silicon atoms within each molecule, (B) an organohydrogenpolysiloxane containing at least 2 hydrogen atoms bonded to silicon atoms within each molecule, (C) an addition reaction catalyst, preferably (D) a finely powdered silica with a specific surface area of at least 50 $m^2/g$, (E) an organosilicon compound containing an epoxy group and a silicon atom-bonded alkoxy group within each molecule, and (F) an oxyzirconium compound was used for the silicone rubber coating layer of a curtain air bag, meaning leakage of the inflator gas could be suppressed, enabling inflation of the curtain air bag to be sustained for a satisfactory period, and they were therefore able to complete the present invention.

Accordingly, a first aspect of the present invention provides a liquid silicone rubber coating composition, comprising:

(A) 100 parts by mass of an organopolysiloxane containing 2 or more alkenyl groups bonded to silicon atoms within each molecule, (B) an organohydrogenpolysiloxane containing at least 2 hydrogen atoms bonded to silicon atoms within each molecule, in sufficient quantity that the total number of hydrogen atoms bonded to silicon atoms in the composition is within a range from 1 to 10 for each silicon atom-bonded alkenyl group within the component (A), (C) an effective quantity of an addition reaction catalyst, (D) 0 to 50 parts by mass of a finely powdered silica with a specific surface area of at least 50 $m^2/g$, (E) 0.1 to 10 parts by mass of an organosilicon compound containing an epoxy group and a silicon atom-bonded alkoxy group within each molecule, and (F) 0.1 to 5 parts by mass of an oxyzirconium compound.

A second aspect of the present invention provides a curtain air bag comprising:

a substrate comprising a fibrous fabric and a silicone rubber coating layer comprising a cured product of the composition, wherein said silicone rubber coating layer is formed on at least one surface of said substrate.

A third aspect of the present invention provides a method of producing the curtain air bag, comprising the steps of: applying the composition to at least one surface of a substrate comprising a fibrous fabric, and curing said composition, thereby forming a silicone rubber coating layer comprising a cured product of said composition on at least one surface of said substrate.

According to the present invention, a liquid silicone rubber coating composition that exhibits excellent adhesion to an air bag base fabric can be obtained. A curtain air bag comprising:

a substrate comprising a fibrous fabric and
a silicone rubber coating layer comprising a cured product of the composition,
wherein said silicone rubber coating layer is formed on at least one surface of said substrate, suppresses leakage of the inflator gas, thus enabling the inflation time to be sustained for a satisfactory period.

DETAILED DESCRIPTION OF THE PREFERRED EMBODIMENTS

As follows is a more detailed description of the present invention. In the present invention, viscosity values refer to values measured using a rotational viscometer.

<Liquid Silicone Rubber Coating Composition>

A liquid silicone rubber coating composition of the present invention comprises the components (A) through (F) described below, and is a liquid at room temperature (defined as 25° C., this also applies below). As follows is a detailed description of each of these components.

[Component (A)]

The organopolysiloxane of the component (A) contains 2 or more alkenyl groups bonded to silicon atoms within each molecule, and functions as the base polymer of the composition of the present invention. The organopolysiloxane of the component (A) may be either a single compound, or a combination of two or more different compounds.

There are no particular restrictions on the molecular structure of the component (A), and suitable structures include, for example, straight-chain, cyclic, branched-chain, and three dimensional network structures, although a straight-chain diorganopolysiloxane in which the principal chain comprises essentially repeating diorganosiloxane units, and both molecular chain terminals are blocked with triorganosiloxy units is preferred (wherein, these organo groups may include an alkenyl group). Furthermore, in those cases where the molecular structure of the organopolysiloxane of the component (A) is either a straight chain or a branched chain, the positions within the organopolysiloxane molecule of the silicon atoms to which the alkenyl groups are bonded may be either one of, or both, the molecular chain terminals and positions within the molecular chain (namely, non-terminal positions). The component (A) is most preferably a straight-chain diorganopolysiloxane containing alkenyl groups bonded to at least the silicon atoms at both molecular chain terminals.

Examples of the alkenyl groups bonded to silicon atoms within the component (A) include, for example, mutually identical or different, unsubstituted or substituted alkenyl groups, typically containing from 2 to 8, and preferably from 2 to 4, carbon atoms. Specific examples include a vinyl group, allyl group, propenyl group, butenyl group, pentenyl group, hexenyl group, cyclohexenyl group or heptenyl group, and of these, a vinyl group is particularly preferred.

The quantity of alkenyl groups bonded to silicon atoms within the component (A), relative to the total number of monovalent organic groups bonded to silicon atoms, is preferably within a range from 0.001 to 10 mol %, and is even more preferably from 0.01 to 5 mol %.

Examples of the monovalent organic groups bonded to silicon atoms within the component (A) other than the above alkenyl groups include, for example, mutually identical or different, aliphatic unsaturated bonding-free, unsubstituted or substituted monovalent hydrocarbon groups, typically containing from 1 to 12, and preferably from 1 to 10, carbon atoms. Examples of monovalent hydrocarbon groups that have been substituted include halogen-substituted groups. Specific examples of these organic groups include alkyl groups such as a methyl group, ethyl group, propyl group, butyl group, pentyl group, hexyl group, cyclohexyl group or heptyl group; aryl groups such as a phenyl group, tolyl group, xylyl group or naphthyl group; aralkyl groups such as a benzyl group or phenethyl group; and halogenated alkyl groups such as a chloromethyl group, 3-chloropropyl group or 3,3,3-trifluoropropyl group, and of these, a methyl group or phenyl group is particularly preferred.

The viscosity at 25° C. of the component (A) is preferably within a range from 100 to 500,000 mPa·s, and is even more preferably within a range from 300 to 100,000 mPa·s. A viscosity value within this range yields more favorable handling for the resulting composition, as well as superior physical properties for the resulting silicone rubber.

Preferred examples of the component (A) include organopolysiloxanes represented by an average composition formula (1) shown below:

$$R_a SiO_{(4-a)/2} \quad (1)$$

(wherein, R represents mutually identical or different, unsubstituted or substituted monovalent hydrocarbon groups of 1 to 10, and preferably 1 to 8, carbon atoms, and a represents a number within a range from 1.5 to 2.8, preferably from 1.8 to 2.5, and even more preferably from 1.95 to 2.05, provided that 0.001 to 10 mol %, and preferably from 0.01 to 5 mol % of all the R groups are alkenyl groups). Specific examples of the R groups include the alkenyl groups listed above as examples of the alkenyl groups bonded to silicon atoms within the component (A), and the organic groups listed above as examples of the monovalent organic groups bonded to silicon atoms within the component (A) other than the alkenyl groups.

Specific examples of the organopolysiloxane of the component (A) include copolymers of dimethylsiloxane and methylvinylsiloxane with both molecular chain terminals blocked with trimethylsiloxy groups, methylvinylpolysiloxane with both molecular chain terminals blocked with trimethylsiloxy groups, copolymers of dimethylsiloxane, methylvinylsiloxane and methylphenylsiloxane with both molecular chain terminals blocked with trimethylsiloxy groups, dimethylpolysiloxane with both molecular chain terminals blocked with dimethylvinylsiloxy groups, methylvinylpolysiloxane with both molecular chain terminals blocked with dimethylvinylsiloxy groups, copolymers of dimethylsiloxane and methylvinylsiloxane with both molecular chain terminals blocked with dimethylvinylsiloxy groups, copolymers of dimethylsiloxane, methylvinylsiloxane and methylphenylsiloxane with both molecular chain terminals blocked with dimethylvinylsiloxy groups, dimethylpolysiloxane with both molecular chain terminals blocked with divinylmethylsiloxy groups, copolymers of dimethylsiloxane and methylvinylsiloxane with both molecular chain terminals blocked with divinylmethylsiloxy groups, dimethylpolysiloxane with both molecular chain terminals blocked with trivinylsiloxy groups, copolymers of dimethylsiloxane and methylvinylsiloxane with both molecular chain terminals blocked with trivinylsiloxy groups, organosiloxane copolymers comprising siloxane units represented by the formula $R^1_3SiO_{0.5}$, siloxane units represented by the formula $R^1_2R^2SiO_{0.5}$, siloxane units represented by the formula $R^1_2SiO$, and siloxane units represented by the formula $SiO_2$, organosiloxane copolymers comprising siloxane units represented by the formula $R^1_3SiO_{0.5}$, siloxane units represented by the formula $R^1_2R^2SiO_{0.5}$, and siloxane units represented by the formula SiO₂, organosiloxane copolymers comprising siloxane units represented by the formula $R^1{}_2R^2SiO_{0.5}$, siloxane units represented by the formula $R^1{}_2SiO$, and siloxane units represented by the formula $SiO_2$, organosiloxane copolymers comprising siloxane units represented by the formula $R^1R^2SiO$, and siloxane units represented by the formula $R^1SiO_{1.5}$ or siloxane units represented by the formula $R^3SiO_{1.5}$, and mixtures of two or more of these organopolysiloxanes.

The groups $R^1$ within the above formulas represent identical or different, aliphatic unsaturated bonding-free, unsubstituted or substituted monovalent hydrocarbon groups containing preferably 1 to 12, more preferably 1 to 10 carbon atoms, and examples of suitable groups include alkyl groups such as a methyl group, ethyl group, propyl group, butyl group, pentyl group, hexyl group, cyclohexyl group or heptyl group; aryl groups such as a phenyl group, tolyl group, xylyl group or naphthyl group; aralkyl groups such as a benzyl group or phenethyl group; and halogenated alkyl groups such as a chloromethyl group, 3-chloropropyl group or 3,3,3-trifluoropropyl groups. The groups $R^2$ in the above formulas are mutually identical or different, unsubstituted or substituted alkenyl groups containing preferably 2 to 8, more preferably 2 to 4 carbon atoms, and examples of suitable groups include a vinyl group, allyl group, butenyl group, pentenyl group, hexenyl group or heptenyl group.

[Component (B)]

The organohydrogenpolysiloxane of the component (B) undergoes a hydrosilylation addition reaction with the component (A). It acts as a cross-linking agent. The organohydrogenpolysiloxane of the component (B) may be used singly or in combination of two or more. The molecular structure of the component (B) is not limited, and a variety of organohydrogenpolysiloxanes which have been conventionally produced, with straight-chain, cyclic, branched-chain structures, or three dimensional network (i.e., resinous) structure, can be used.

The organohydrogenpolysiloxane of the component (B) contains at least 2 (typically, about 2 to 300), preferably 3 or more (typically, 3 to 200, and more preferably about 3 to 100) silicon atom-bonded hydrogen atoms (i.e., hydrosilyl groups or SiH). Where the organohydrogenpolysiloxane of the component (B) has a straight-chain structure, the SiH groups may be present either at a terminal end of the molecular chain or inside thereof (i.e., at a non-terminal position), or at the both thereof.

The number of silicon atoms per molecule (i.e., degree of polymerization) of the component (B) is preferably 2 to 300, more preferably 3 to 200, still more preferably 4 to 150 or so. The component (B) is preferably liquid at room temperature (25° C.), and it preferably has a viscosity at 25° C. of 0.1 to 1,000 mPa·s, more preferably 0.5 to 500 mPa·s.

As the component (B), for example, organohydrogenpolysiloxanes having the following average composition formula (2) can be used.

$$R^3{}_bH_cSiO_{(4-b-c)/2} \qquad (2)$$

(wherein $R^3$ are identical or different, aliphatic unsaturated bonding-free, unsubstituted or substituted, silicon atom-bonded monovalent hydrocarbon groups containing preferably 1 to 10, more preferably 1 to 8, carbon atoms; b and c are positive integers meeting preferably $0.7 \leq b \leq 2.1$, and $0.001 \leq c \leq 1.0$, provided $0.8 \leq b+c \leq 3.0$, and more preferably $1.0 \leq b \leq 2.0$, and $0.01 \leq c \leq 1.0$, provided $1.5 \leq b+c \leq 2.5$.

The aforementioned $R^3$ include, for example, alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group, and decyl group; aryl groups such as a phenyl group, tolyl group, xylyl group and naphthyl group; aralkyl groups such as a benzyl group, a phenylethyl group, and phenylpropyl group; and groups formed by substitution of a part or the whole of the hydrogen atoms contained in these hydrocarbon groups with halogen atoms such as fluorine atoms, bromine atoms and chlorine atoms, e.g., halogenated alkyl groups such as a chloromethyl group, chloropropyl group, bromoethyl group or trifluoropropyl group. $R^3$ groups are preferably alkyl groups and aryl groups, and more preferably a methyl group and a phenyl group.

Specific examples of the component (B) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, copolymers of dimethylsiloxane and methylhydrogensiloxane with both terminals blocked with trimethylsiloxy groups, copolymers of dimethylsiloxane, methylhydrogensiloxane and diphenylsiloxane with both terminals blocked with trimethylsiloxy groups, methylhydrogenpolysiloxane with both terminals blocked with dimethylhydrogensiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of dimethylsiloxane and methylphenylsiloxane with both terminals blocked with dimethylhydrogensiloxy groups, copolymers of dimethylsiloxane and diphenylsiloxane with both terminals blocked with dimethylhydrogensiloxy groups, methylphenylpolysiloxane with both terminals blocked with dimethylhydrogensiloxy groups, diphenylpolysiloxane with both terminals blocked with dimethylhydrogensiloxy groups, organohydrogensiloxanes formed by substitution of a part or the whole of the methyl groups of the compounds exemplified above with ethyl groups, propyl groups, or other alkyl groups, organosiloxane copolymers composed of siloxane units having the formula: $R^3{}_3SiO_{0.5}$, siloxane units having the formula: $R^3{}_2HSiO_{0.5}$, and siloxane units having the formula: $SiO_2$, organosiloxane copolymers composed of siloxane units having the formula: $R^3{}_2HSiO_{0.5}$ and siloxane units having the formula: $SiO_2$, organosiloxane copolymers composed of siloxane units having the formula: $R^3HSiO$, and at least one unit of siloxane units having the formula: $R^3SiO_{1.5}$ and siloxane units having the formula: $HSiO_{1.5}$, and mixtures of 2 or more of these organopolysiloxanes. In the formulas above, $R^3$ are as defined above.

The blend quantity of the component (B) is set so that the number of silicon atom-bonded hydrogen atoms within the composition for each silicon atom-bonded alkenyl group within the component (A) is typically within a range from 1 to 10 atoms, and preferably from 1 to 5 atoms. If this blend quantity is such that the number of silicon atom-bonded hydrogen atoms within the composition for each silicon atom-bonded alkenyl group within the component (A) is less than 1 atom, then the curing of the obtained composition tends to be unsatisfactory. Furthermore, if the blend quantity is such that the number of silicon atom-bonded hydrogen atoms within the composition for each silicon atom-bonded alkenyl group within the component (A) exceeds 10 atoms, then the heat resistance of the product silicone rubber tends to deteriorate markedly.

The composition according to the present invention may contain, as optional components, organohydrogenpolysiloxanes other than the component (B) and the component (E) described below. In the case where such other organohydrogenpolysiloxanes are added to the composition, the total number of the SiH groups in the components (B) and (E) and the optionally added organohydrogenpolysiloxanes other than the components (B) and (E) is preferably 1 to 10, particularly 1 to 5, per the silicon atom-bonded alkenyl groups contained in the component (A). Furthermore, in such a case, the molar ratio of the number of SiH groups in the component (B) to the total number of SiH groups stated above is preferably 0.5 to 1, more preferably 0.7 to 1.

In an embodiment in which the composition contains, as organohydrogenpolysiloxanes, only the component (B), the component (B) is preferably present in a quantity such that the number of hydrogen atoms bonded to silicon atoms contained in the component (B) is within a range from 1 to 10 for each silicon atom-bonded alkenyl group within said component (A).

[Component (C)]

The addition reaction catalyst of the component (C) may be any catalyst that is capable of promoting the hydrosilylation addition reaction between the silicon atom-bonded alkenyl groups within the component (A) and the SiH groups within the component (B). The component (C) may use either a single catalyst, or a combination of two or more different catalysts. Suitable examples of the component (C) include platinum-group metals such as platinum, palladium, and rhodium, chloroplatinic acid, alcohol-modified chloroplatinic acid, coordination compounds of chloroplatinic acid with olefins, vinylsiloxane, or acetylene compounds, and platinum-group metal compounds such as tetrakis(triphenylphosphine)palladium and chlorotris(triphenylphosphine)rhodium, although of these, platinum compounds are preferred.

The blend quantity of the component (C) need only be sufficient to be effective as an addition reaction catalyst, and a preferred quantity, calculated as the mass of the catalytic metal element relative to the combined mass of the components (A) and (B), is within a range from 1 to 500 ppm, with quantities from 10 to 100 ppm being particularly desirable. Provided the blend quantity falls within this range, the addition reaction can be satisfactorily accelerated, curing occurs favorably, and the rate of the addition reaction can be increased easily by increasing the blend quantity of the catalyst, which is desirable from an economic viewpoint.

[Component (D)]

The finely powdered silica of the component (D), which is used as an optional component in the present invention when required, functions as a reinforcing agent. In other words, the component (D) imparts a high tear strength to the cured product of the composition of the present invention. Accordingly, by using the finely powdered silica of the component (D) as a reinforcing agent, a coating film with superior tear strength properties can be formed. The finely powdered silica of the component (D) typically has a specific surface area of at least 50 $m^2/g$, and this value is preferably within a range from 50 to 400 $m^2/g$, and even more preferably from 100 to 300 $m^2/g$. Provided the specific surface area falls within this range, superior tear strength properties can be imparted to the cured product. The specific surface area is measured using the BET method. The component (D) may use either a single material, or a combination of two or more different materials.

Provided the specific surface area falls within the range specified above, the finely powdered silica of the component (D) can employ known silica materials conventionally used as reinforcing fillers within silicone rubbers, including fumed silica and precipitated silica.

These finely powdered silica materials may be used as is, although in order to impart a superior level of flowability to the composition of the present invention, are preferably used in the form of a hydrophobic finely powdered silica, wherein the surface of the silica has undergone hydrophobic treatment with an organosilicon compound, including a methylchlorosilane such as trimethylchlorosilane, dimethyldichlorosilane, or methyltrichlorosilane; a dimethylpolysiloxane; or a hexaorganodisilazane such as hexamethyldisilazane, divinyltetramethyldisilazane, or dimethyltetravinyldisilazane.

The blend quantity of the component (D) must be not more than 50 parts by mass (namely, from 0 to 50 parts by mass) per 100 parts by mass of the organopolysiloxane of the component (A). If the blend quantity exceeds 50 parts by mass, then the flowability of the composition may deteriorate, causing a worsening of the coating workability. The blend quantity is preferably within a range from 0.1 to 50 parts by mass, even more preferably from 1 to 50 parts by mass, and is most preferably from 5 to 40 parts by mass. If the blend quantity falls within this range, then a particularly favorable tear strength can be more readily imparted to the cured product of the composition of the present invention.

[Component (E)]

The component (E) may use any organosilicon compound, provided the compound contains an epoxy group and a silicon atom-bonded alkoxy group (e.g., as an alkoxysilyl group such as trialkoxysilyl, organodialkoxysilyl, diorganoalkoxysilyl groups, and the like) within each molecule. From the viewpoint of achieving superior adhesion, an organosilicon compound containing at least 1 epoxy group and at least 2 silicon atom-bonded alkoxy groups, such as a silane containing at least 1 epoxy group and at least 2 silicon atom-bonded alkoxy groups, or a cyclic or straight-chain siloxane containing from 2 to 30, and preferably from 4 to 20 silicon atoms and containing at least 1 epoxy group and at least 2 silicon atom-bonded alkoxy groups is preferred. The component (E) may use either a single compound, or a combination of two or more different compounds.

The epoxy group is preferably bonded to a silicon atom in the form of a glycidoxyalkyl group such as a glycidoxypropyl group; or an epoxy group-containing cyclohexylalkyl group such as a 2,3-epoxycyclohexylethyl group or 3,4-epoxycyclohexylethyl group. The silicon atom-bonded alkoxy group is bonded to a silicon atom, and preferably forms a trialkoxysilyl group such as a trimethoxysilyl group or triethoxysilyl group; or an alkyldialkoxysilyl group such as a methyldimethoxysilyl group, ethyldimethoxysilyl group, methyldiethoxysilyl group, or ethyldiethoxysilyl group.

Furthermore, besides the epoxy group and silicon atom-bonded alkoxy group within each molecule, the component (E) may also include other functional groups, including at least one functional group selected from the group consisting of alkenyl groups such as a vinyl group, an acryloxy group, a methacryloxy group, and a hydrosilyl group (SiH group).

Examples of the organosilicon compound of the component (E) include the organosilicon compounds represented by chemical formulas shown below, mixtures of 2 or more of these compounds, and partial hydrolysis-condensation products of one or more of these compounds.

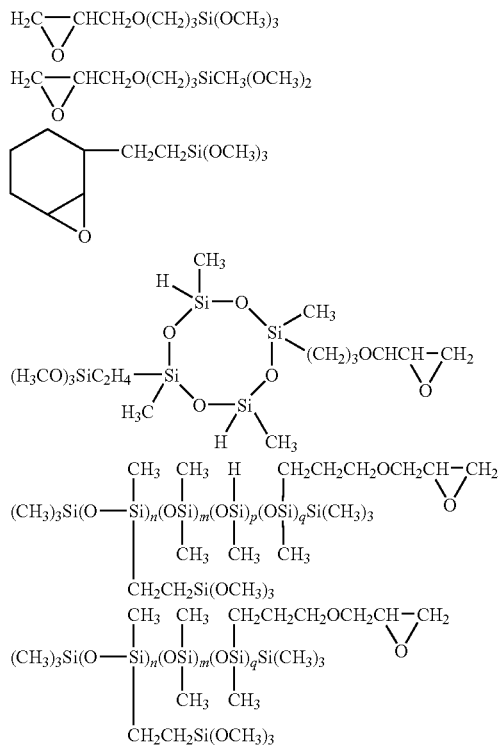

(wherein, n is an integer from 1 to 10, m is an integer from 0 to 100, and preferably an integer from 0 to 20, p is an integer from 1 to 100, and preferably an integer from 1 to 20, and q is an integer from 1 to 10)

The blend quantity of the component (E) is within a range from 0.1 to 10 parts by mass, and preferably from 0.1 to 5 parts by mass, per 100 parts by mass of the component (A). If this blend quantity is less than 0.1 parts by mass, then the resulting composition may not exhibit adequate self-adhesion. If the blend quantity exceeds 10 parts by mass, then properties of the resulting cured product is apt to be deteriorated.

[Component (F)]

The component (F) is an oxyzirconium compound, which functions as a condensation-assisting catalyst for promoting adhesion, and also has a great favorable effect on airtightness. The component (F) may use either a single compound, or a combination of two or more different compounds. Examples of the oxyzirconium compound of the component (F) include, for example, oxyzirconium compounds with identical or different two monovalent organooxy groups in each molecule, represented by the chemical formulas (3) to (5) shown below, and compounds formed by substitution of a part of said organooxy groups with an organosiloxane residual group.

In the chemical formulas (3) to (5), $R^4$ represents an identical or different, aliphatic unsaturated bonding-free, unsubstituted or substituted, monovalent hydrocarbon groups containing preferably 1 to 20, more preferably 1 to 10, carbon atoms, and $R^5$ represents an identical or different, aliphatic unsaturated bonding-free, unsubstituted or substituted, monovalent hydrocarbon groups or hydrocarbonoxy groups containing preferably 1 to 20, more preferably 1 to 10, carbon atoms. The hydrocarbonoxy groups may contain 1 or 2 etheric oxygen atoms within each group.

The hydrocarbon group represented by $R^4$ and $R^5$ stated above include, for example, alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group, decyl group, dodecyl group, tridecyl group, tetradecyl group, hexadecyl group, octadecyl group, and eicosyl group; aryl groups such as a phenyl group, tolyl group, xylyl group and naphthyl group; aralkyl groups such as a benzyl group, a phenylethyl group, and phenylpropyl group; and groups formed by substitution of a part or the whole of the hydrogen atoms contained in these hydrocarbon groups with halogen atoms such as fluorine atoms, bromine atoms and chlorine atoms, e.g., halogenated alkyl groups such as a chloromethyl group, chloropropyl group, bromoethyl group or trifluoropropyl group.

The hydrocarbonoxy group which may contain one or two etheric oxygen atoms inside the group, represented by $R^5$, includes, for example, alkoxy groups such as a methoxy group, ethoxy group, propoxy group, isopropoxy group, butoxy group, isobutoxy group, and tert-butoxy group; and alkoxy-substituted alkoxy groups such as a methoxymethoxy group, methoxyethoxy group, ethoxymethoxy group, and ethoxyethoxy group. As the group $R^4$ preferred are alkyl groups containing 1 to 8 carbon atoms, and more preferred are a methyl group, ethyl group, propyl group, butyl group, pentyl group, hexyl group, and heptyl group. As the $R^5$ group preferred are alkyl groups containing 1 to 8 carbon atoms and alkoxy groups containing 1 to 4 carbon atoms, and more preferred are a methyl group, ethyl group, propyl group, butyl group, pentyl group, hexyl group, heptyl group, methoxy group, and ethoxy group.

In the groups $R^4$ and $R^5$, a part of the hydrogen atoms bonded to carbon atoms may be substituted with a straight-chain, cyclic or branched monovalent organopolysiloxane residual group with typically 1 to 20 silicon atoms, and preferably 2 to 10 silicon atoms.

The compounds formed by substitution of a part of said monovalent organooxy groups, such as $-OR^4$, $-OC(=O)R^4$, and $-OC(R^4)=CHC(=O)R^5$ with an organosiloxane residual group, include compounds represented by the chemical formulas (3) to (5) stated above, provided a part of the hydrogen atoms bonded to carbon atoms contained in one or two groups of $-OR^4$, $-OC(=O)R^4$, and $-OC(R^4)=CHC(=O)R^5$ present in a molecule have been substituted with a straight-chain, cyclic or branched organopolysiloxane structure with typically 1 to 20 silicon atoms, and preferably 2 to 10 silicon atoms. Specific examples of the component (F) include, besides Compound A and Compound B used in Examples, compounds shown below:

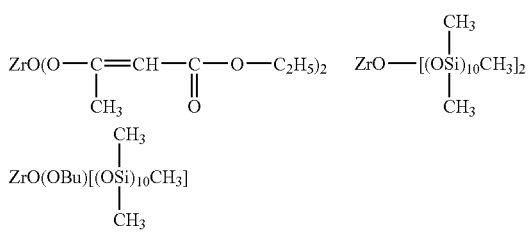

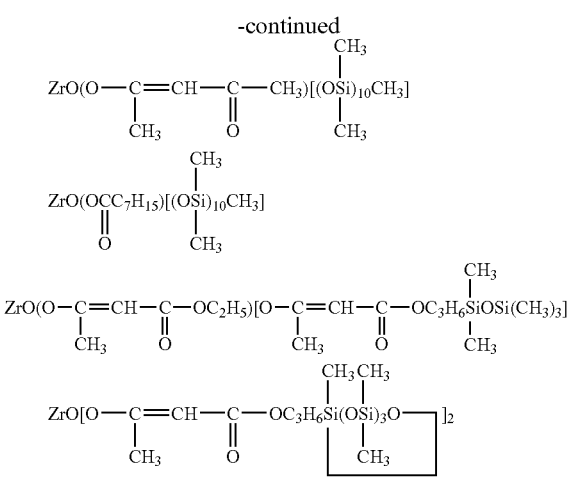

The blend quantity of the component (F) is typically within a range from 0.1 to 5 parts by mass, and preferably from 0.2 to 2 parts by mass, per 100 parts by mass of the component (A). If the blend quantity is less than 0.1 parts by mass, then the resulting composition tends to exhibit inferior adhesion, and the resulting air bag tends to exhibit inferior airtightness. If the blend quantity exceeds 5 parts by mass, then the heat resistance of the obtained cured product tends to deteriorate.

[Other Components]

In addition to the components (A) through (F) described above, other optional components can also be added to the composition of the present invention, provided such addition does not impair the object of the present invention. Specific examples of these other components include those described below. These other components can be used either alone, or in combinations of two or more different materials.

Reaction Retarders

A reaction retarder may be any compound that exhibits a suppression effect on the curing reaction promoted by the addition reaction catalyst of the aforementioned component (C), and conventional reaction retarders can be used. Specific examples of suitable retarders include phosphorus-containing compounds such as triphenylphosphine; nitrogen-containing compounds such as tributylamine, tetramethylethylenediamine, and benzotriazole; sulfur-containing compounds; acetylene-based compounds such as acetylene alcohols; compounds that contain two or more alkenyl groups; hydroperoxy compounds; and maleic acid derivatives.

The size of the curing suppression effect provided by the reaction retarder varies depending on the chemical structure of the reaction retarder, and consequently the quantity added of the reaction retarder is preferably adjusted to the most appropriate quantity for the particular reaction retarder being used. By using the most appropriate quantity of the reaction retarder, a composition with superior long term storage stability at room temperature and superior curability can be obtained.

Inorganic Fillers

Examples of suitable inorganic fillers include inorganic fillers such as crystalline silica, hollow fillers, silsesquioxanes, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber; fillers in which the above types of inorganic fillers have undergone hydrophobic surface treatment with an organosilicon compound such as an organoalkoxysilane compound, organochlorosilane compound, organosilazane compound, or low molecular weight siloxane compound; silicone rubber powders; and silicone resin powders.

Other Components

Examples of other components include, for example, organopolysiloxanes containing one silicon atom-bonded hydrogen atom within each molecule, but containing no other functional groups, organopolysiloxanes containing one silicon atom-bonded alkenyl group within each molecule, but containing no other functional groups, non-functional organopolysiloxanes containing no silicon atom-bonded hydrogen atoms, no silicon atom-bonded alkenyl groups, and no other functional groups, as well as organic solvents, creep hardening prevention agents, plasticizers, thixotropic imparting agents, pigments, dyes, and moldproofing agents.

[Method of Preparation]

The liquid silicone rubber coating composition of the present invention can be prepared by mixing the above components together in accordance with normal methods.

[Air Bags]

A liquid silicone rubber coating composition obtained in this manner is consequently particularly suited to the production of curtain air bags, which are housed along the edge of the roof from the front pillar, and must be capable of maintaining an inflated state for a certain period of time in order to protect the region around the head and prevent people being flung from the vehicle during a collision or rollover of the vehicle.

In the present invention, examples of the air bags, and particularly curtain air bags, on which a silicone rubber coating layer comprising a cured product of the above composition is formed include air bags of conventional construction, and specific examples include air bags in which a woven fabric of any of various synthetic fibers such as 6,6-nylon, 6-nylon, polyester fiber, aramid fiber, any of the various polyamide fibers, or any of the various polyester fibers is used as the base fabric, two sheets of this plain base fabric that have been rubber-coated on the inside surfaces are bonded together with an adhesive around their respective peripheries, and the adhesive layer is then stitched (hereafter referred to as plain fabric air bags), and woven air bags in which an aforementioned woven fabric is used as the base fabric, and the bag portion is formed by weaving.

The silicone rubber coating layer can be formed by applying the aforementioned liquid silicone rubber coating composition to at least one surface of, and preferably to only one surface of, the substrate formed of a fibrous fabric, and then conducting curing by, for example, performing heating inside a hot air drying oven. Thus, the silicone rubber coating layer is formed on the surface. The silicone rubber-coated base fabric for a curtain air bag obtained in this manner can then be used to produce a curtain air bag.

Examples of the substrate comprising a fibrous fabric include substrates that use any of the aforementioned synthetic fiber woven fabrics as a base fabric. Furthermore, conventional methods can be adopted as the method for coating the above composition onto this substrate, and the thickness of the coating layer (or the quantity of the 2 composition applied to the surface) is preferably within a range from 10 to 150 g/m$^2$, even more preferably from 15 to 80 g/m$^2$, and is most preferably from 20 to 60 g/m$^2$.

The coating composition of the present invention can be cured under conventional curing conditions using conventional curing methods. Specifically, the composition can be cured, for example, by heating at a temperature of 120 to 180° C. for a period of 1 to 10 minutes.

EXAMPLES

As follows is a more detailed description of the present invention that presents a series of examples and comparative examples, although the present invention is in no way limited by the examples presented below.

Example 1

<Preparation of Composition>

60 parts by mass of a dimethylpolysiloxane with a viscosity at 25° C. of approximately 30,000 mPa·s and with both molecular chain terminals blocked with vinyldimethylsiloxy groups, 8 parts by mass of hexamethyldisiloxane, 2 parts by mass of water, and 40 parts by mass of a fumed silica with a specific surface area determined by the BET method of approximately 300 m²/g (product name: Aerosil (a registered trademark) 300, manufactured by Nippon Aerosil Co., Ltd.) were placed in a kneader and mixed together for one hour at room temperature, yielding a mixture. Subsequently, the mixture was heated to 150° C., and mixing was continued for a further two hours. Following subsequent cooling of the mixture to room temperature, 24 parts by mass of the dimethylpolysiloxane with a viscosity at 25° C. of approximately 30,000 mPa·s and with both molecular chain terminals blocked with vinyldimethylsiloxy groups, and 5 parts by mass of a dimethylpolysiloxane with a viscosity at 25° C. of approximately 700 mPa·s, containing 5 mol % of vinylmethylsiloxane units relative to the total of the all diorganosiloxane units within the molecular main chain and with both molecular chain terminals blocked with trimethylsiloxy groups were added, and mixing was continued until a uniform mixture was obtained, thus yielding a base compound (I).

To 64 parts by mass of this base compound (I) were added and mixed 8 parts by mass of a dimethylpolysiloxane with a viscosity at 25° C. of approximately 30,000 mPa·s and with both molecular chain terminals blocked with vinyldimethylsiloxy groups, and containing 0.18 mol % of vinylmethylsiloxane units in the diorganosiloxane units constituting the backbone chain, 23 parts by mass of a dimethylpolysiloxane with a viscosity at 25° C. of approximately 30,000 mPa·s and with both molecular chain terminals blocked with vinyldimethylsiloxy groups, 35 parts by mass of a dimethylpolysiloxane with a viscosity at 25° C. of approximately 100,000 mPa·s and with both molecular chain terminals blocked with vinyldimethylsiloxy groups, 3 parts by mass of a copolymer of dimethylsiloxane and methylhydrogensiloxane with a viscosity at 25° C. of 10 mPa·s, containing silicon atom-bonded hydrogen atoms at non-terminal positions of the molecular chain and with both molecular chain terminals blocked with trimethylsiloxy groups (silicon atom-bonded hydrogen atom content=0.82% by mass), 0.02 parts by mass of 1-ethynylcyclohexanol, 0.25 parts by mass of a dimethylpolysiloxane solution of a complex of chloroplatinic acid and 1,3-divinyltetramethyldisiloxane containing a platinum atom content of 1% by mass, 0.14 parts by mass of tetramethyltetravinylcyclotetrasiloxane, 0.7 parts by mass of γ-glycidoxypropyltrimethoxysilane, and 0.32 parts by mass of an oxyzirconium compound (Compound A) shown below, thus completing preparation of a composition A.

<Airtightness Test>

The composition as prepared above was coated uniformly on a base fabric for woven air bags with as small an amount as possible of the composition (80 g/m²) to obtain a coating without irregularity. The coated base fabric was then heated at 170° C. for 1 minute in an oven to cure the composition, thus producing a woven air bag. The woven air bag was subjected to the airtightness test. The test was conducted by inflating the air bag with an air of 140 kPa, and then measuring the remaining pressure inside the air bag after 30 seconds. The airtightness was evaluated by the remaining pressure measured. Results are given in Table 1.

<Scott Flexing Test>

A Scott flexing test was conducted using a Scott flexing test device. The woven air bag stated above was subjected to 300 flexions using an applied pressure of 4 kgf. The degree of separation of the silicone rubber coating film was ascertained visually. Evaluation was performed according to the following criterion. The results are shown in Table 1.

Passed: The cases in which separation of the coating film from the base fabric was not observed.

Failure: The cases in which separation of the coating film from the base fabric was observed.

Example 2

The procedure of Example 1 was repeated, except for using 0.25 parts by mass of another oxyzirconium compound (Compound B stated below) in place of 0.32 parts by mass of Compound A, to prepare composition B, and conducted the airtightness test and scott flexing test. The results are shown in Table 1.

Comparative Example 1

The procedure of Example 1 was repeated, except for using 0.4 parts by mass of zirconium tetraacetylacetonate (Compound C stated below) in place of 0.32 parts by mass of Compound A, to prepare composition C, and conducted the airtightness test and scott flexing test. The results are shown in Table 1.

Comparative Example 2

The procedure of Example 1 was repeated, except for using 0.4 parts by mass of zirconium dibutoxybis(ethyl acetoacetate) (Compound D stated below) in place of 0.32 parts by mass of Compound A, to prepare composition D, and conducted the airtightness test and scott flexing test. The results are shown in Table 1.

Compound A:

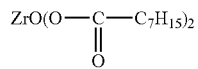

Compound B:

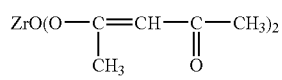

Compound C:

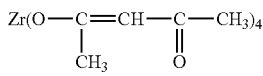

Compound D:

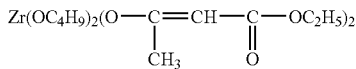

TABLE 1

| | Example 1 | Example 2 | Comparative example 1 | Comparative example 2 |
|---|---|---|---|---|
| Airtightness test (kPa) | 50 | 48 | 10 | 5 |
| Scott flexing test | Passed | Passed | Passed | Failed |

What is claimed is:

1. A liquid silicone rubber coating composition, comprising:
   (A) 100 parts by mass of at least one organopolysiloxane containing 2 or more alkenyl groups bonded to silicon atoms within each molecule,
   (B) at least one organohydrogenpolysiloxane containing at least 2 hydrogen atoms bonded to silicon atoms within each molecule, in sufficient quantity that the total number of hydrogen atoms bonded to silicon atoms in the composition is within a range from 1 to 10 for each silicon atom-boned alkenyl group within said component (A),
   (C) an effective quantity of at least one addition reaction catalyst,
   (D) 0 to 50 parts by mass of at least one finely powdered silica with a specific surface area of at least 50 m$^2$/g,
   (E) 0.1 to 10 parts by mass of at least one organosilicon compound containing an epoxy group and a silicon atom-bonded alkoxy group within each molecule, and
   (F) 0.1 to 5 parts by mass of at least one oxyzirconium compound.

2. The composition according to claim 1, wherein the component (B) is present in a quantity such that the number of hydrogen atoms bonded to silicon atoms contained in the component (B) is within a range from 1 to 10 for each silicon atom-boned alkenyl group within said component (A).

3. The composition according to claim 1, which is used in a curtain air bag.

4. A curtain air bag comprising:
   a substrate formed of a fibrous fabric and
   a silicone rubber coating layer comprising a cured product of the composition defined in claim 1, and formed on at least one surface of said substrate.

5. A method of producing a curtain air bag according to claim 4, comprising:
   applying said composition to at least one surface of a substrate formed of a fibrous fabric, and
   curing the applied composition, thereby forming a silicone rubber coating layer comprising a cured product of the composition on at least one surface of said substrate.

6. The composition according to claim 1, wherein component (A) is at least one organopolysiloxane represented by formula (1)

$$R_a SiO_{(4-a)/2} \quad (1)$$

wherein
   each R represents independently an unsubstituted or substituted monovalent hydrocarbon group of 1 to 10 carbon atoms, and
   a represents a number within a range from 1.5 to 2.8,
   provided that 0.001 to 10 mol % of all the R groups are alkenyl groups.

7. The composition according to claim 1, wherein component (A) is at least one organopolysiloxane selected from the group consisting of a copolymer of dimethylsiloxane and methylvinylsiloxane with both molecular chain terminals blocked with trimethylsiloxy groups; a methylvinylpolysiloxane with both molecular chain terminals blocked with trimethylsiloxy groups; a copolymer of dimethylsiloxane, methylvinylsiloxane and methylphenylsiloxane with both molecular chain terminals blocked with trimethylsiloxy groups; a dimethylpolysiloxane with both molecular chain terminals blocked with dimethylvinylsiloxy groups; a methylvinylpolysiloxane with both molecular chain terminals blocked with dimethylvinylsiloxy groups; a copolymer of dimethylsiloxane and methylvinylsiloxane with both molecular chain terminals blocked with dimethylvinylsiloxy groups; a copolymer of dimethylsiloxane, methylvinylsiloxane and methylphenylsiloxane with both molecular chain terminals blocked with dimethylvinylsiloxy groups; a dimethylpolysiloxane with both molecular chain terminals blocked with divinylmethylsiloxy groups; a copolymer of dimethylsiloxane and methylvinylsiloxane with both molecular chain terminals blocked with divinylmethylsiloxy groups; a dimethylpolysiloxane with both molecular chain terminals blocked with trivinylsiloxy groups; a copolymer of dimethylsiloxane and methylvinylsiloxane with both molecular chain terminals blocked with trivinylsiloxy groups; an organosiloxane copolymer comprising siloxane units represented by $R^1_3SiO_{0.5}$, siloxane units represented by $R^1_2R^2SiO_{0.5}$, siloxane units represented by $R^1_2SiO$, and siloxane units represented by the formula $SiO_2$; an organosiloxane copolymer comprising siloxane units represented by the formula $R^1_3SiO_{0.5}$, siloxane units represented by the formula $R^1_2R^2SiO_{0.5}$, and siloxane units represented by the formula $SiO_2$; an organosiloxane copolymer comprising siloxane units represented by $R^1_2R^2SiO_{0.5}$, siloxane units represented by $R^1_2SiO$, and siloxane units represented by $SiO_2$; and an organosiloxane copolymer comprising siloxane units represented by $R^1R^2SiO$, and siloxane units represented by $R^1SiO_{1.5}$ or siloxane units represented by $R^3SiO_{1.5}$, wherein
   each $R^1$ group within the above formulas independently represents a saturated, unsubstituted or substituted, monovalent hydrocarbon group containing 1 to 12 carbon atoms and
   each $R^2$ group in the above formulas independently represents an unsubstituted or substituted alkenyl groups containing 2 to 8 carbon atoms.

8. The composition according to claim 1, wherein said at least one organohydrogenpolysiloxane is represented by formula (2)

$$R^3_b H_c SiO_{(4-b-c)/2} \quad (2)$$

wherein, each $R^3$ represents independently a saturated, unsubstituted or substituted, silicon atom-bonded monovalent hydrocarbon group having from 1 to 10 carbon atoms, and b and c represent positive numbers that satisfy $0.7 \leq b \leq 2.1$, $0.001 \leq c \leq 1.0$ and $0.8 \leq b+c \leq 3.0$.

9. The composition according to claim 1, wherein said at least one organohydrogenpolysiloxane is at least one member selected from the group consisting of 1,1,3,3-tetramethyldisiloxane; 1,3,5,7-tetramethylcyclotetrasiloxane; tris(hydrogendimethylsiloxy)methylsilane; tris(hydrogendimethylsiloxy)phenylsilane; methylhydrogencyclopolysiloxane; a cyclic copolymer of methylhydrogensiloxane and dimethylsiloxane; a methylhydrogenpolysiloxane with both terminals blocked with trimethylsiloxy groups; a copolymer of dimethylsiloxane and methylhydrogensiloxane with both terminals blocked with trimethylsiloxy groups; a copolymers of dimethylsiloxane and methylhydrogensiloxane with both terminals blocked with trimethylsiloxy groups; a copolymer of dimethylsiloxane, methylhydrogensiloxane and diphenylsiloxane with both terminals blocked with trimethylsiloxy groups; a methylhydrogenpolysiloxane with both terminals blocked with dimethylhydrogensiloxy groups; a dimethylpolysiloxane with both terminals blocked with dimethylhydrogensiloxy groups; a copolymer of dimethylsiloxane and methylhydrogensiloxane with both terminals blocked with dimethylhydrogensiloxy groups; a copolymer of dimethylsiloxane and methylphenylsiloxane with both terminals blocked with dimethylhydrogensiloxy groups; a copolymer of dimethylsiloxane and diphenylsiloxane with both terminals blocked with dimethylhydrogensiloxy groups; a methylphenylpolysiloxane with both terminals blocked with dimethylhydrogensiloxy groups; a diphenylpolysiloxane with both terminals blocked with dimethylhydrogensiloxy groups; an organosiloxane copolymer having siloxane units represented by $R^3{}_3SiO_{0.5}$, siloxane units represented by $R^3{}_2HSiO_{0.5}$, and siloxane units represented by $SiO_2$; an organosiloxane copolymer having siloxane units represented by $R^3{}_2HSiO_{0.5}$ and siloxane units represented by $SiO_2$; and an organosiloxane copolymer having siloxane units represented by $R^3HSiO$, and at least one unit of siloxane units represented by $R^3SiO_{1.5}$ and siloxane units represented by $HSiO_{1.5}$, wherein each $R^3$ represents independently a saturated, unsubstituted or substituted, silicon atom-bonded monovalent hydrocarbon group having from 1 to 10 carbon atoms.

10. The composition according to claim 1, wherein the component (B) is present in a quantity such that the number of hydrogen atoms bonded to silicon atoms contained in the component (B) is within a range from 1 to 5 for each silicon atom-boned alkenyl group within said component (A).

11. The composition according to claim 1, wherein said at least one addition reaction catalyst comprises at least one member selected from the group consisting of platinum, palladium, rhodium, chloroplatinic acid, an alcohol-modified chloroplatinic acid, a coordination compound of chloroplatinic acid with an olefin, a vinylsiloxane compound, an acetylene compound, tetrakis(triphenylphosphine)palladium, and chlorotris-(triphenylphosphine)rhodium.

12. The composition according to claim 1, wherein said at least one addition reaction catalyst is present in an amount of from 1 to 500 ppm relative to the total mass of components (A) and (B).

13. The composition according to claim 1, wherein said at least one addition reaction catalyst is present in an amount of from 10 to 100 ppm relative to the total mass of components (A) and (B).

14. The composition according to claim 1, wherein said at least one organosilicon compound is at least one selected from the group consisting of

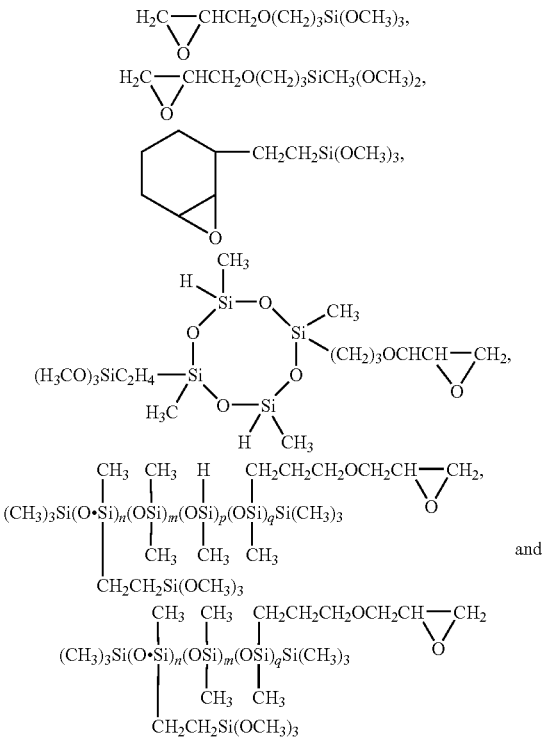

wherein
n is an integer of from 1 to 10,
m is an integer of from 0 to 100,
p is an integer of from 1 to 100, and
q is an integer from 1 to 10.

15. The composition according to claim 1, wherein said at least one oxyzirconium compound is present in an amount of from 0.1 to 5 to parts by mass per 100 parts by mass of said at least one organopolysiloxane.

16. The composition according to claim 1, wherein said at least one oxyzirconium compound is present in an amount of from 0.2 to 2 to parts by mass per 100 parts by mass of said at least one organopolysiloxane.

17. The composition according to claim 1, wherein said at least one oxyzirconium compound is at least one compound represented by formula (3), (4) or (5):

$$ZrO(OR^4)_2 \qquad (3)$$

$$ZrO(OC(=O)R^4)_2 \qquad (4)$$

$$ZrO(OC(R^4)=CHC(=O)R^5)_2 \qquad (5)$$

wherein each $R^4$ and $R^5$ independently represents a saturated, unsubstituted or substituted, monovalent hydrocarbon groups containing 1 to 20 carbon atoms.

18. The composition according to claim 16, wherein in each $R^4$ and $R^5$ group is independently a member selected from the group consisting of a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, a decyl group, a dodecyl group, a tridecyl group, a tetradecyl group, a hexadecyl group, an octadecyl group, an eicosyl group, a phenyl group, a tolyl group, a xylyl group, a naphthyl group, a benzyl group, a phenylethyl group, a phenylpropyl group; a chloromethyl group, a chloropropyl group, a bromoethyl group, and a trifluoropropyl group.

19. The composition according to claim 1, wherein said at least one oxyzirconium compound is at least one member selected from the group consisting of

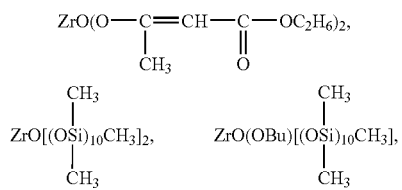

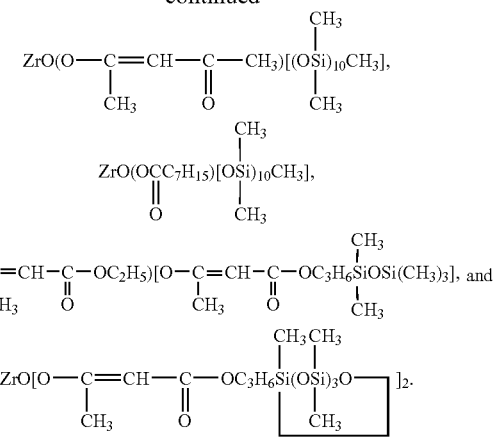

* * * * *